United States Patent [19]

Gaddi

[11] Patent Number: 4,488,618
[45] Date of Patent: Dec. 18, 1984

[54] BODY FOR MOTORSCOOTER

[75] Inventor: Bruno Gaddi, Pisa, Italy

[73] Assignee: Piaggio & C. S.p.A., Genoa, Italy

[21] Appl. No.: 446,615

[22] Filed: Dec. 3, 1982

[30] Foreign Application Priority Data

Dec. 9, 1981 [IT] Italy .............................. 23723/81[U]

[51] Int. Cl.³ .............................................. B62K 11/10
[52] U.S. Cl. ................................ 180/219; 280/281 B; 280/289 A
[58] Field of Search .............................. 180/219, 225; 280/281 B, 289 A

[56] References Cited

FOREIGN PATENT DOCUMENTS

| 841700 | 6/1952 | Fed. Rep. of Germany ... 280/289 A |
| 306229 | 3/1955 | Switzerland ......................... 180/219 |
| 332032 | 8/1958 | Switzerland ................... 280/281 B |

Primary Examiner—Joseph F. Peters, Jr.
Assistant Examiner—D. Lynn Fugate
Attorney, Agent, or Firm—Cushman, Darby & Cushman

[57] ABSTRACT

A bearing body for motorscooter, comprising lateral cowls formed solidly therewith, also comprising releasable restraining means for securing a spare wheel to the side of the body within one of said cowls, there being also a lockable aperture, proximal to said securing means, inside said cowl.

3 Claims, 3 Drawing Figures

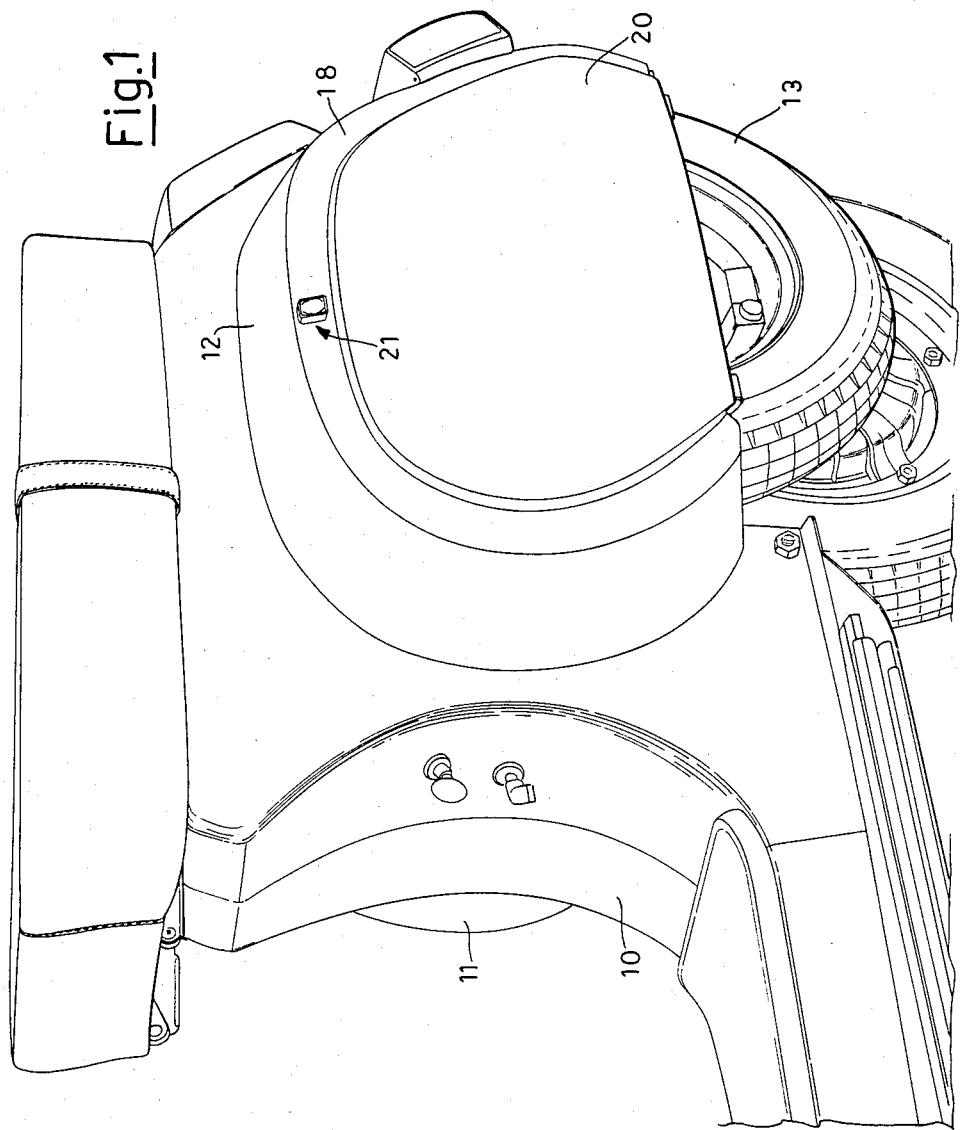

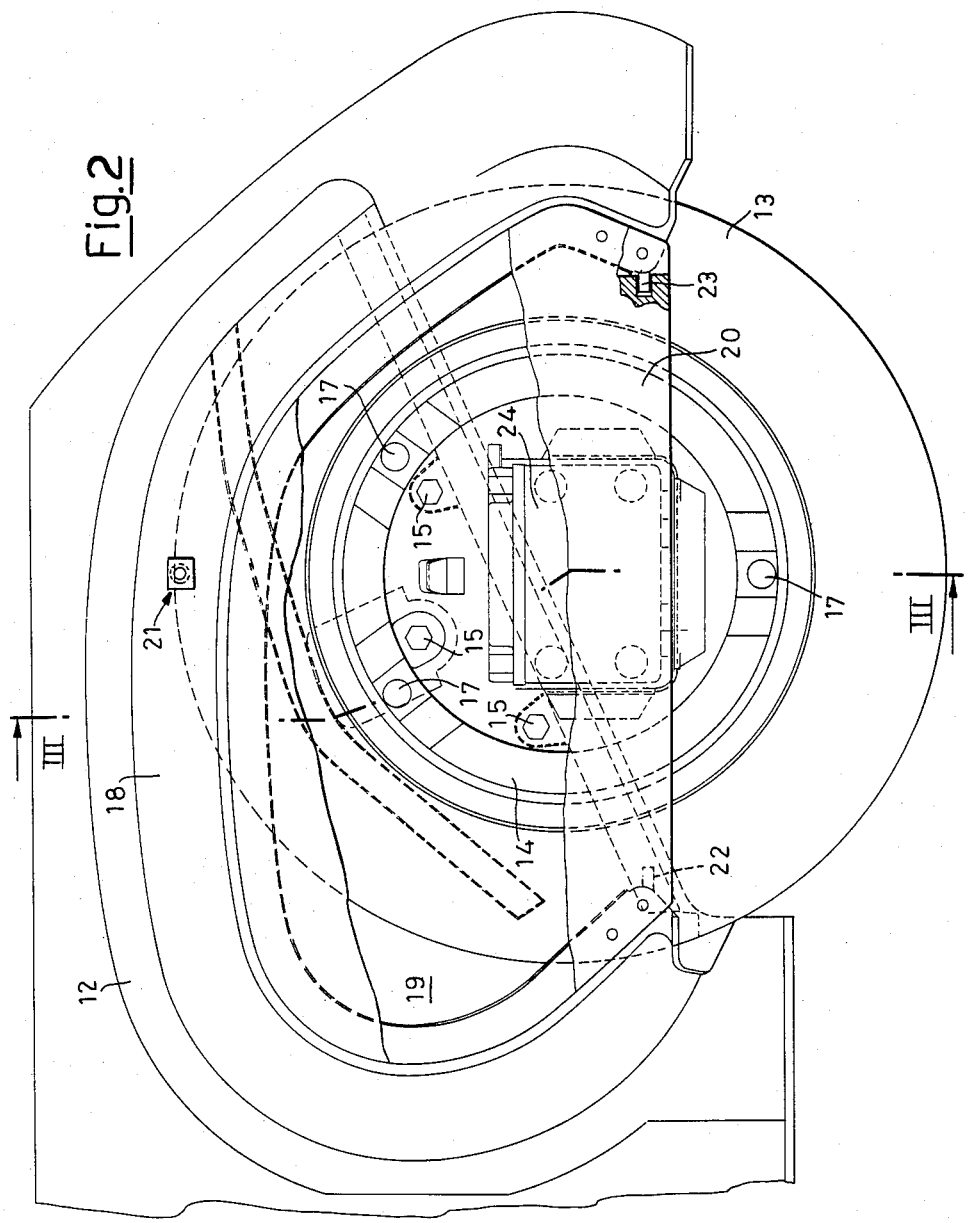

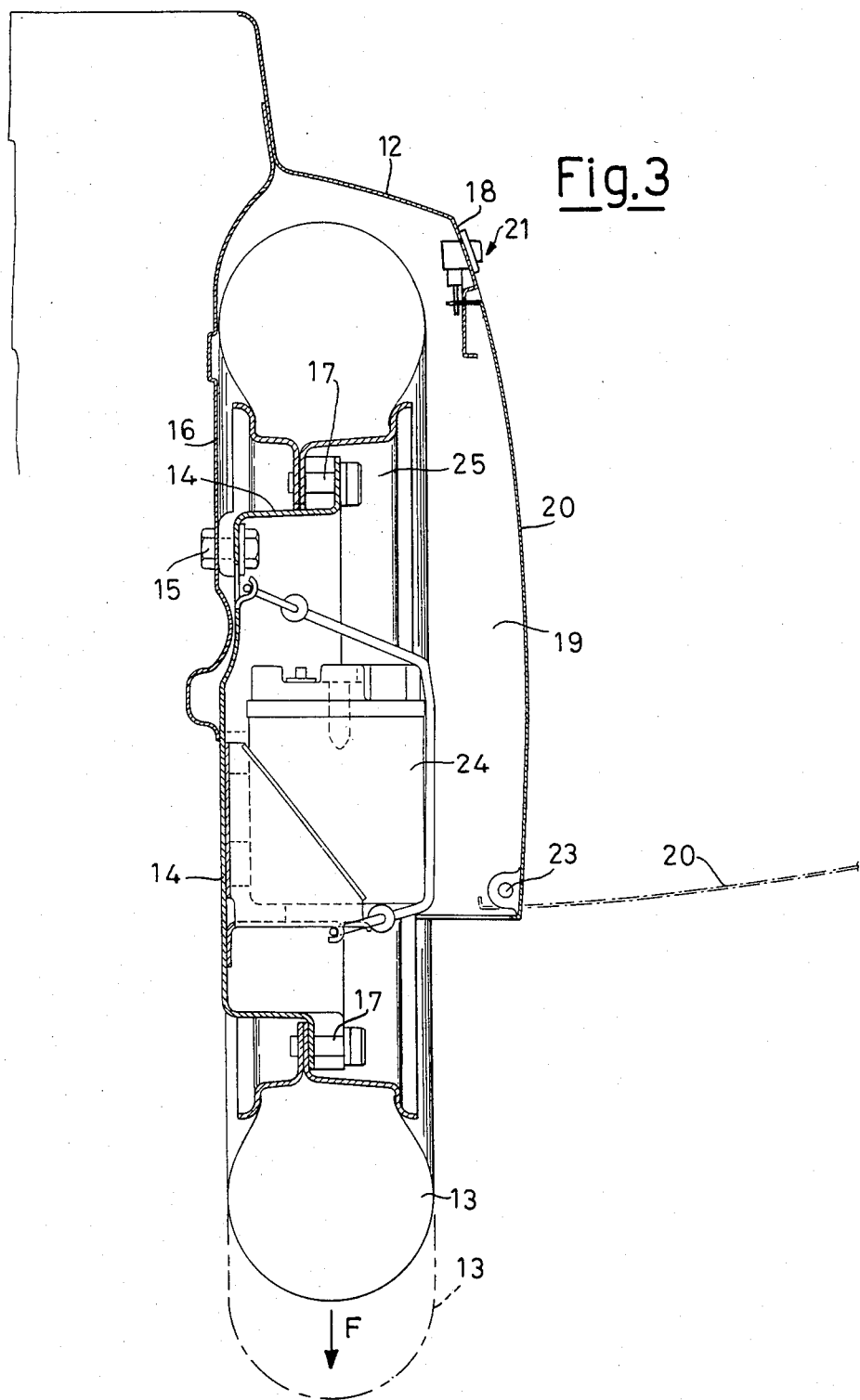

BODY FOR MOTORSCOOTER

The present invention relates to an improved body for motorscooters, adapted to house a spare wheel.

The location of the spare wheel in a motorscooter is always a problem for the manufacturer.

There is the need to house the spare wheel within the body to prevent its being removed unlawfully and also so as not to cause additional bulk. On the other hand, the space available within the body is extremely limited.

In many types of motorscooters the only free space is in the interior of one of the two lateral cowls.

In effect, in the large cylinder capacity models, the spare wheel is housed in one of the two lateral cowls. The fact that the cowl cover can be removed, moreover, means that should the need arise access to the spare wheel is simple and fast.

In the small cylinder capacity models, however, the lateral cowls are formed solid with the body and it therefore becomes problematical to house the spare wheel inside one of them and, in particular, also to enable the user to have simple and rapid access to the spare wheel.

The object of the present invention is to provide a body for motorscooters with lateral cowls formed solidly with the body itself, such as enables the spare wheel to be housed in one of the two cowls and allows simple and rapid access to be had to it.

This object is attained by means of a motorscooter body of the type comprising lateral cowls formed solidly with it, characterized in that it also comprises releasable means for restraining a spare wheel on one side of the body inside one of said cowls, there also being a lockable aperture in said cowl, in the proximity of the said restraining means.

To clarify the characteristics of the present invention an exemplifying and non-restrictive embodiment is now described, with reference to the attached drawings, in which:

FIG. 1 is a perspective view of a body according to the invention, and more exactly of its characteristic part;

FIG. 2 is a frontal and partly sectional view of the characteristic part of the body of FIG. 1;

FIG. 3 is a section of the body of FIG. 1 along the line III—III of FIG. 2.

In FIG. 1 there is illustrated the rear portion of a bearing body 10 of a motorscooter in which provision is made for two lateral cowls 11 and 12 formed solidly with the body 10.

As is known, the cowl 11 is adapted to house part of the engine.

For the purpose of housing a spare wheel 13 in the cowl 12, the body 10 comprises a concave support 14 secured by bolts 15 to a side 16 of the said body within the cowl 12. The spare wheel 13 can be secured, parallel to the side 16, to the support 14 by further bolts 17 which join the borders of the support 14 to the rim 25 of the spare wheel 13.

To allow access to be had to the spare wheel 13, there is formed in the wall 18 of the cowl 12, that is to say the wall opposite the side 16, an aperture 19 which can be closed by a shutter 20. The shutter 20 is in its lower part pivoted to the cowl 12 at 22 and 23 in such a manner as to be tiltable outwards, and can be locked in its upper portion 21 with a key-operated lock solid with the wall 18.

As can be noted, when the shutter 20 is closed the spare wheel 13 protrudes downwards from the cowl 12, but the bolts 15 in any case remain hidden from view and inaccessible.

When the spare wheel 13 is required, for example to substitute a punctured tire, the procedure adopted is as follows.

The shutter 20 is released from restraint of the lock 21 and is tilted (dashed line of FIG. 3); the bolts 15 are fully unscrewed so as to release the support 14 from the side 16; the spare wheel 13 is removed from below together with the support body 14 by sliding it parallel to the side 16 as shown by the arrow F of FIG. 3; finally, the bolts 17 are fully unscrewed so as to free the spare wheel 13 from the support 14. The spare wheel can now be used to substitute the wheel requiring substitution.

To fit the punctured wheel into the cowl 12, the same operations as described are performed but in reverse order.

The removal of a wheel from or its placing into the housing provided for the purpose within the cowl 12 is thus a straightforward and rapid operation.

The lock 21 prevents persons of ill intent from opening the shutter 20 to gain access to the bolts 15 in order to remove the wheel.

Once a wheel is housed in the cowl 12, there is also sufficient space therein to house the storage battery 24 of the motorscooter.

Said storage battery 24 is positioned in the concave portion of the support 14, as shown in FIG. 3.

The present embodiment, which is of exemplifying kind, does not limit any variants and/or additions.

More particularly, means can be provided for securing the spare wheel 13 directly to the side 16, without interposing the support 14. In this case, after releasing the restraint of said securing means, the spare wheel 13 can be removed from the cowl 12 and will at once be ready to be substituted for the punctured tire.

I claim:

1. In a motorscooter provided with a spare wheel: a bearing body comprising lateral cowls formed solidly with said body and opened downwardly, in opposite position with respect to one of said cowls, inside said bearing body, there being fixed a frame which defines with the cowl a seat for the spare wheel, said spare wheel being removable from the seat out of the bearing body by a sliding movement downwardly through the opening of the cowl, restraining means for securing in a releasable manner said spare wheel to the frame, there being formed in said cowl an aperture closed by a lockable door for access to the restraining means.

2. In a motorscooter: a motorscooter body having a generally vertical side wall; a cowl joined to said body and having a cowl side wall spaced outwardly of said body side wall so as to define a space, open at its lower end, between said side wall and said cowl, said cowl side wall including a hinged shutter which is openable outwardly and a key-operated lock for releasably locking said shutter in a closed position; a spare wheel located in said space; means in said space releasably attaching said spare wheel to said body side wall, the arrangement being such that said releasable attaching means is accessible only when said shutter is in an open position and such that upon release of said attaching means said spare wheel is removable from said space downwardly through said open end of said space.

3. A motorscooter as in claim 2 wherein said releasable attaching means includes a spare wheel support releasably attached to said body side wall and at least one releasable fastener releasably fastening said spare wheel to said support, said fastener being located such that it is accessible only when said shutter is in its open position.

* * * * *